United States Patent
Hellegouarch et al.

(10) Patent No.: US 9,738,392 B2
(45) Date of Patent: Aug. 22, 2017

(54) SUSPENSION STRUCTURE WITH VARIABLE GEOMETRY OF A TURBOPROP ENGINE ON A STRUCTURAL ELEMENT OF AN AIRCRAFT

(71) Applicant: SNECMA, Paris (FR)

(72) Inventors: Antoine Hellegouarch, Montgeron (FR); Mathieu Ange Poisson, Corbeil-Essonnes (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 219 days.

(21) Appl. No.: 14/762,281

(22) PCT Filed: Jan. 15, 2014

(86) PCT No.: PCT/FR2014/050072
§ 371 (c)(1),
(2) Date: Jul. 21, 2015

(87) PCT Pub. No.: WO2014/111654
PCT Pub. Date: Jul. 24, 2014

(65) Prior Publication Data
US 2015/0360788 A1    Dec. 17, 2015

(30) Foreign Application Priority Data

Jan. 21, 2013  (FR) .................... 13 50501
Apr. 17, 2013  (FR) .................... 13 53492

(51) Int. Cl.
B64D 27/26    (2006.01)
B64D 27/14    (2006.01)
(Continued)

(52) U.S. Cl.
CPC ............. *B64D 27/26* (2013.01); *B64D 27/10* (2013.01); *B64D 27/12* (2013.01); *B64D 27/14* (2013.01)

(58) Field of Classification Search
CPC ........ B64D 27/10; B64D 27/12; B64D 27/14; B64D 27/26; B64D 2027/005;
(Continued)

(56) References Cited

U.S. PATENT DOCUMENTS

2006/0012091 A1    1/2006  Rose et al.
2011/0259996 A1   10/2011  Vetters et al.
2012/0018577 A1    1/2012  Quiroz-Hernandez

FOREIGN PATENT DOCUMENTS

EP    1607330 A1    12/2005
FR    2942205 A1     8/2010

OTHER PUBLICATIONS

International Search Report issued May 14, 2014 in PCT/FR2014/050072 filed Jan. 15, 2014.

*Primary Examiner* — Nicholas McFall
(74) *Attorney, Agent, or Firm* — Oblon, McClelland, Maier & Neustadt, L.L.P.

(57) ABSTRACT

A variable geometry suspension structure for suspending a turboprop from a structural element of an aircraft, the structure including a rear cradle for fastening to a structural element of an aircraft and a front cradle for supporting a front portion of the turboprop, the front cradle being connected to the rear cradle, firstly via a pivot connection configured to enable the front cradle to tilt vertically relative to the rear cradle, and secondly by a return spring configured to prevent the front cradle from tilting while thrust from the turboprop is below a predetermined threshold.

12 Claims, 4 Drawing Sheets

(51) Int. Cl.
*B64D 27/10* (2006.01)
*B64D 27/12* (2006.01)

(58) Field of Classification Search
CPC ........ B64D 2027/026; B64D 2027/262; B64D 2027/264; B64D 2027/266; B64D 2027/268
See application file for complete search history.

SUSPENSION STRUCTURE WITH VARIABLE GEOMETRY OF A TURBOPROP ENGINE ON A STRUCTURAL ELEMENT OF AN AIRCRAFT

BACKGROUND OF THE INVENTION

The present invention relates to the general field of aircraft turboprops having unducted propellers. The invention relates more precisely to attaching such turboprops to a structural element of an aircraft.

In known manner, an airplane turboprop is an aviation turbine engine that generates thrust mainly by means of an unducted propeller positioned at the front of the engine. By way of example, such a turboprop may be mounted under an airplane wing by means of a suspension structure, which structure needs in particular to withstand the thrust forces from the engine and the rotary torque from the propeller.

During various stages of flight of the aircraft, such as takeoff and while climbing, the propeller of the turboprop is subjected to a stream of air having a non-zero angle of incidence. During such stages of flight, the stream of air is no longer parallel to the axis of rotation of the propeller of the turboprop.

Unfortunately, that angle of incidence leads to numerous drawbacks, in particular in terms of reducing the efficiency of the propeller and in terms of noise nuisance. In addition, such an angle of incidence imparts an aerodynamic moment to the propeller that applies heavy loading to the mechanical structure of the turboprop. In order to remedy that, the structure needs to be reinforced, which involves a weight penalty.

OBJECT AND SUMMARY OF THE INVENTION

There thus exists a need to be able to have a turboprop suspension structure that enables the angle of incidence seen by the propeller to be limited in stages during which the aircraft propelled by the turboprop is taking off and climbing.

In accordance with, the invention, this object is achieved by a variable geometry suspension structure for suspending a turboprop from a structural element of an aircraft, the structure comprising a rear cradle for fastening to a structural element of an aircraft and a front cradle for supporting a front portion of the turboprop, the front cradle being connected to the rear cradle, firstly via a pivot connection suitable for enabling the front cradle to tilt vertically relative to the rear cradle, and secondly by a return spring suitable for preventing the front cradle from tilting while thrust from the turboprop is below a predetermined threshold.

So long as the thrust from the turboprop remains below the threshold structure, the return spring prevents any forward tilting of the turboprop (given that it is supported solely by the front cradle). The turboprop remains in a horizontal position. In contrast, when the thrust from the turboprop exceeds the threshold thrust, the turboprop tilts forwards under the effect of this thrust. By appropriately rating the return spring, it is thus possible to enable the turboprop to slope forwards during certain stages of flight of the aircraft. In particular, it is possible to enable the turboprop to tilt forwards solely during stages in which the aircraft is taking off and climbing (corresponding to stages in which the thrust from the turboprop is the greatest), with the turboprop remaining in its nominal horizontal position during the other stages of flight. Such tilting of the turboprop thus makes it possible to reduce considerably the angle of incidence seen by the propeller of the turboprop during those critical stages of flight.

Furthermore, such a variable geometry suspension structure is of relatively simple design and is compatible with the forces it needs to withstand (in particular the thrust from the turboprop and the rotary torque from the propeller). Specifically, the suspension structure does not require any external power supply nor any dedicated regulator system, since the thrust from the turboprop on its own serves directly to manage the position of the suspension structure. Such a suspension structure is thus reliable and presents low maintenance costs. Furthermore, the return spring naturally returns the turboprop towards a horizontal position, i.e. its nominal position, thereby enabling consequences to be limited in the event of an engine failure.

Preferably, the suspension structure further includes means for preventing any lateral movement of the front cradle relative to the rear cradle. Such a characteristic seeking to prevent any lateral movement of the front cradle during titling enables the rear cradle to take up the rotary torque from the propeller, which torque is transmitted to the structural element of the aircraft on which the turboprop is fastened. The variable geometry of the suspension structure is thus not sensitive to the rotary torque from the propeller of the turboprop.

Thus, the rear cradle may have at least one rod provided with a wheel suitable for sliding in an axial slot formed in the front cradle so as to prevent any lateral movement of the front cradle relative to the rear cradle.

Under such circumstances, the slot may be closed at its axial ends so as to limit the angular amplitude of the tilting of the front cradle. In addition, the rod may comprise two branches forming a rearwardly-open V-shape, the wheel being positioned at an intersection between the branches of the rod. The rear cradle may have two rods positioned angularly on either side of the return spring.

The return spring may include a hydraulic damper controlled by a valve to enable the position of the front cradle to be blocked on command of the pilot. The damper serves to ensure that the tilting movement of the front cradle takes place progressively and does not give rise to resonance phenomena.

Furthermore, the presence of the valve controlled by the pilot enables the pilot to block the return spring, and thus the front cradle, in position. This is of use in particular during stages of the aircraft taxiing on the ground prior to takeoff, during which stages the turboprop is at full thrust but its propeller is orthogonal to the air stream (it is on takeoff proper that the pilot operates the valve so as to allow the turboprop to tilt). Likewise, having recourse to such a valve makes it possible to prevent the turboprop from swinging if there is a large amount of turbulence.

Preferably, the return spring possesses stiffness that is calculated so that its return force is greater than thrust from the turboprop corresponding to the aircraft being in a stage of cruising flight, and less than thrust from the turboprop corresponding to the aircraft being in a takeoff and climb stage.

Also preferably, the rear cradle does not have means for supporting the turboprop.

Still more preferably, the suspension structure further includes means for taking up the driving torque from the propeller of the turboprop. Such means enable the wheel of the rear cradle that slides in the slot of the front cradle to be "off-loaded" by allowing the driving torque to be transmitted directly to the rear cradle. For this purpose, the suspension structure may include a torsion bar for taking up the drive torque, which torsion bar is connected at each of its ends to the rear cradle by connecting rods, and is for fastening to the underside of the turboprop.

The invention also provides an aircraft having at least one turboprop mounted on a structural element by a variable geometry suspension structure.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
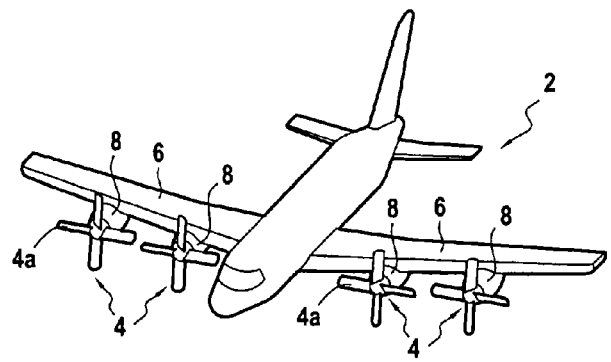
FIG. 1 is a diagrammatic view of an airplane propelled by turboprops that are fastened under the wings of the airplane by suspension structures in accordance with the invention.

FIG. 1 is a highly diagrammatic view of an airplane 2 that is propelled by four turboprops 4 that are fastened under the wings 6 of the airplane. More precisely, the nacelle 8 of each turboprop is fastened to a wing of the airplane by means of spars (not shown in FIG. 1).

In known manner, each turboprop 4 comprises a propeller 4a situated at the front of the engine and driven in rotation about an axis X-X by a turbine (not shown), a stepdown gearbox 4b being interposed between the shaft of the turbine and the rotary shaft X-X of the propeller, in particular for the purpose of increasing the torque that is applied to the propeller.

Figure 2:
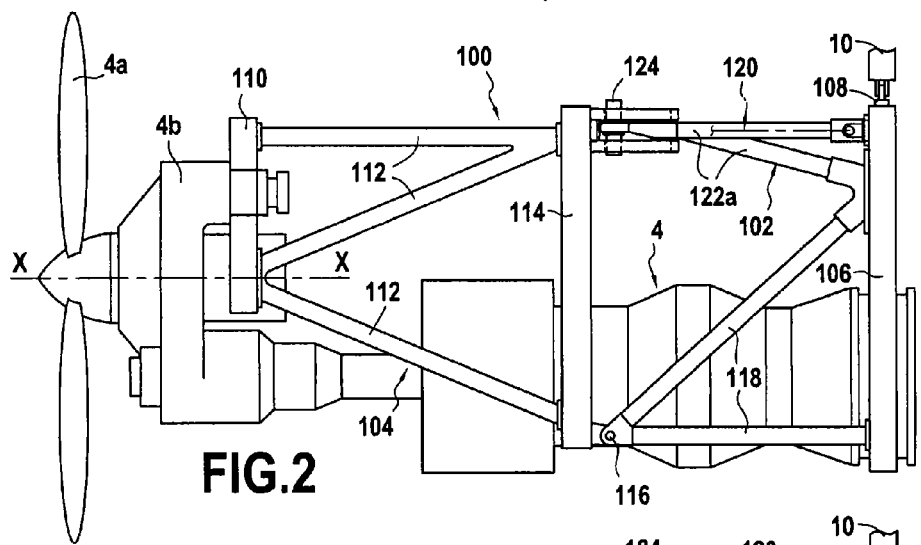
FIGS. 2 and 3 are diagrammatic side views of a FIG. 1 suspension structure in two different positions.
Figure 3:
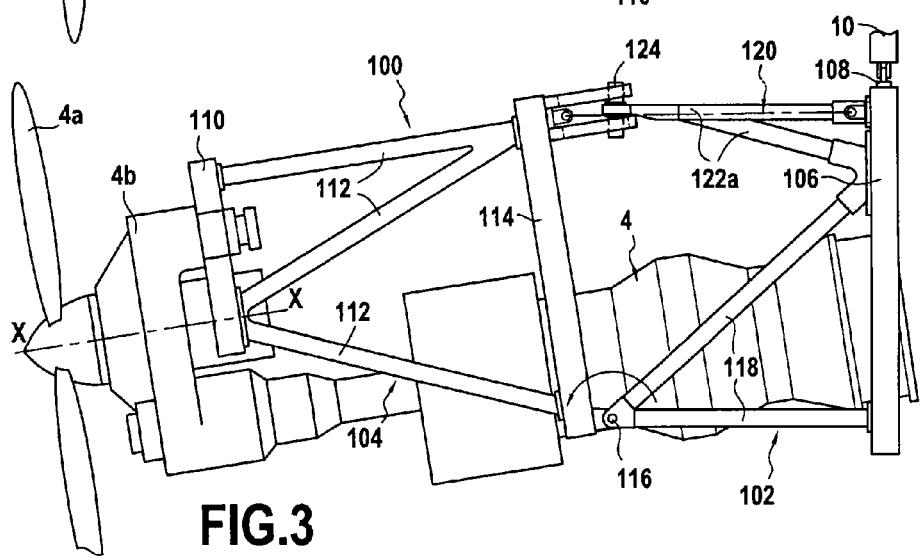

FIGS. 2 and 3 show in greater detail how the turboprops are fastened under the wings of an airplane. Each turboprop 4 is suspended from a suspension structure 100 in accordance with the invention, the structure being fastened under an airplane wing by means of spars 10.

The suspension structure 100 of the invention is of variable geometry. In particular, it has a rear cradle 102 that is fastened to the wing of the aircraft via spars 10, and a front cradle 104 that is movable in pivoting relative to the rear cradle.

The rear cradle 102 has a frame 106 extending in a transverse plane and having a shape that is reminiscent of a horseshoe. The frame 106 has conventional fastener means for fastening it to the spars 10, such as clevises 108, for example. In contrast, it does not have any means for supporting any portion of the turboprop 4.

The front cradle 104 is not fastened directly to the wing of the airplane. It has a front frame 110 of horseshoe shape extending in a transverse plane and having a front portion of the turboprop fastened thereto (e.g. the gearbox 4b). This attachment (not shown in the figures) is provided using conventional attachment means, e.g. suspension rods extending radially from an inside surface of the front frame 110 towards its inside.

The front frame 110 of the front cradle is also connected via a plurality of rods 112 to a main frame 114 extending in a transverse plane. This main frame is also horseshoe shaped.

Furthermore, the front cradle 104 of the suspension structure 100 of the invention is connected to the rear cradle 102 via a pivot connection suitable for allowing the front cradle to tilt vertically relative to the rear cradle.

In the example shown in the figures, each bottom free end of the main frame 114 of the front cradle thus has a pivot 116 about which one end of a rod 118 is hinge-mounted, the opposite end of the rod 118 being fastened to the frame 106 of the rear cradle. This hinge-mount allows the front cradle 104 (which is not fastened to the wing of the airplane) to pivot forwards relative to the rear cradle 102.

The front cradle 104 of the suspension structure is also connected to the rear cradle 102 by a return spring 120 suitable for preventing the front cradle from tilting while thrust from the turboprop is below a predetermined threshold.

More precisely, the return spring 120 has one end fastened to the frame 106 of the rear cradle (in its top middle portion, between its bottom free ends) and an opposite end fastened to the main frame 114 of the front cradle (in its top middle portion, between its bottom free ends provided with the pivots).

The return spring 120 is rated so as to prevent any tilting of the front cradle 104 so long as the thrust from the turboprop has not reached a predetermined threshold thrust. The return spring preferably possesses stiffness that is calculated so that its return force is greater than thrust from the turboprop corresponding to the airplane in a cruising stage of flight and less than thrust from the turboprop thrust corresponding to the airplane in a stage of taking off and climbing.

Thus, in all of the stages of flight of the airplane, with the exception of takeoff and climbing (e.g. during a cruising stage of flight), the return spring 120 holds the front cradle 104 of the suspension structure 100 so that it is in its non-tilted position as shown in FIG. 2. In this position, the turboprop 4 is in a purely horizontal position.

In contrast, while the airplane is in stages of takeoff and climbing, which correspond to stages of flight of the airplane in which the propeller 4a of the turboprop 4 is liable to be subjected to an air stream with a non-zero angle of incidence, the return spring 120, while subjected to the traction force exerted by the turboprop via the suspension structure, can no longer retain the front cradle of the suspension structure. Since the turboprop is fastened solely to the front of the front cradle, it tilts forwards relative to the rear cradle into the position shown in FIG. 3. In this position, the turboprop 4 is thus leaning forwards, thereby limiting the angle of incidence seen by its propeller 4a.

During forward tilting of the cradle, provision is also made to prevent any sideways movement of the front cradle 104 relative to the rear cradle 102.

Figure 4:
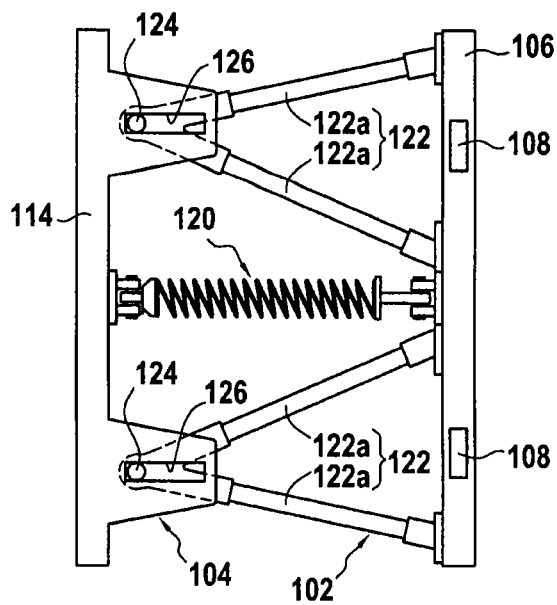
FIGS. 4 and 5 are fragmentary plan views of the suspension structure corresponding to FIGS. 2 and 3.
Figure 5:
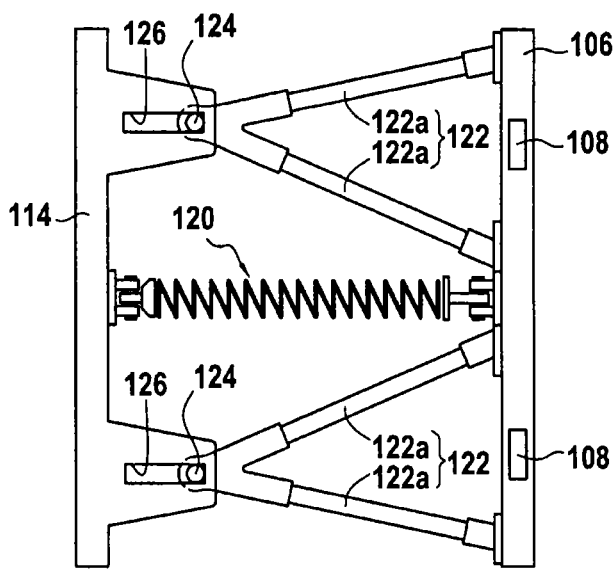

As shown in particular in FIGS. 4 and 5, the frame 106 of the rear cradle 102 includes, in its top middle portion, at least one rod 122 having a wheel 124 suitable for sliding along an axial slot 126 that is formed in the main frame 114 of the front cradle.

More precisely, two rods 122 are provided that are arranged angularly on either side of the return spring 120, each of these rods 122 being made up of two branches 122a forming a rearwardly-open V-shape, with the wheel 124 of each of these rods being positioned at the intersection of the branches.

Furthermore, the slot 126 formed in the main frame 114 of the front cradle is closed at its two axial ends so as to limit the angular amplitude of the forward tilting of the cradle. Thus, in FIG. 4, the front cradle is shown in non-tilted position, while in FIG. 5, it is shown in its tilted position. The length of the slot serves to determine the amplitude of the tilting.

Figure 6:
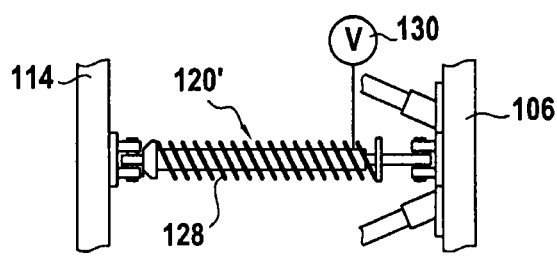
FIG. 6 shows a variant embodiment of the return spring of the suspension structure in accordance with the invention.

In the embodiment shown in FIG. 6, the return spring 120' connecting the frame 106 of the rear cradle to the main frame 114 of the front cradle has a hydraulic damper 128 that is controlled by a valve 130. The valve is controlled by the pilot of the airplane who can thus decide to block the front cradle in position relative to the rear cradle.

Such blocking of the position of the front cradle may be used by the pilot during stages of the airplane taxiing on the ground prior to takeoff proper (the turboprop is at full thrust but the propeller is still orthogonal to the stream), or indeed in the event of high levels of turbulence so as to avoid any swinging of the turboprop.

Figure 7:
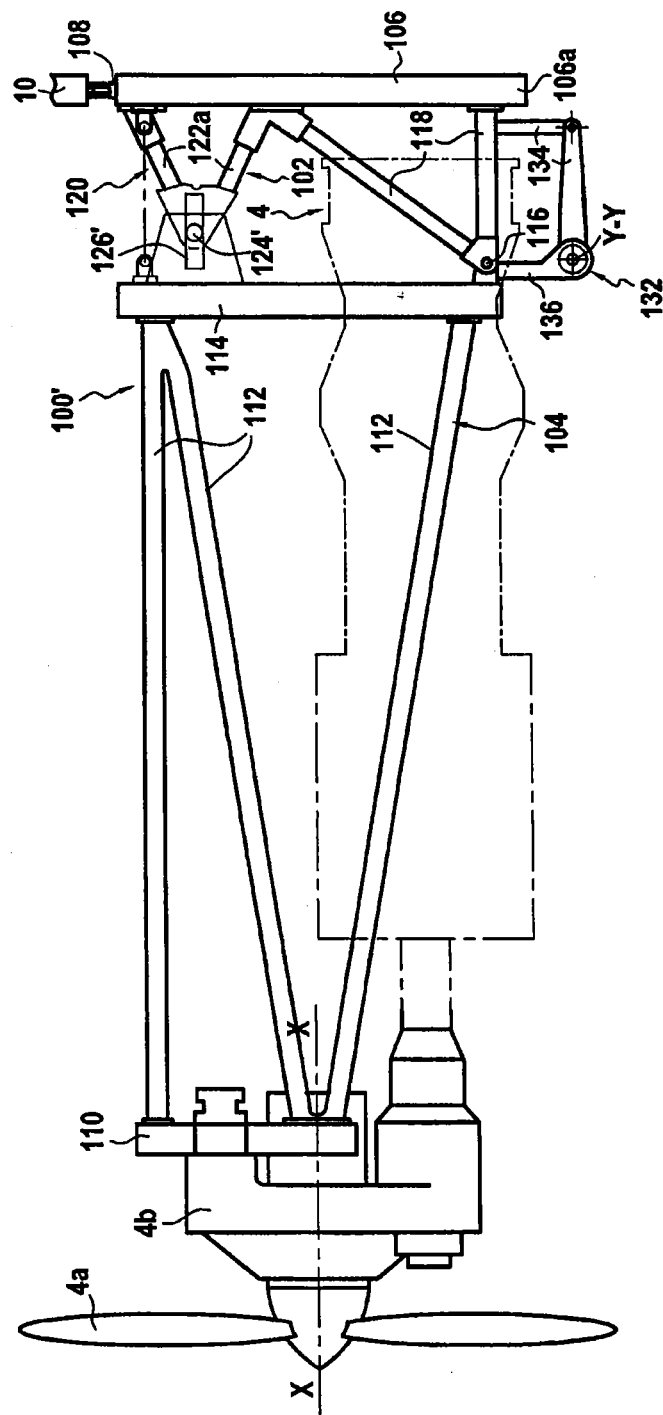
FIGS. 7 and 8 show another embodiment of a suspension structure of the invention, respectively in side view and as seen from beneath.
Figure 8:
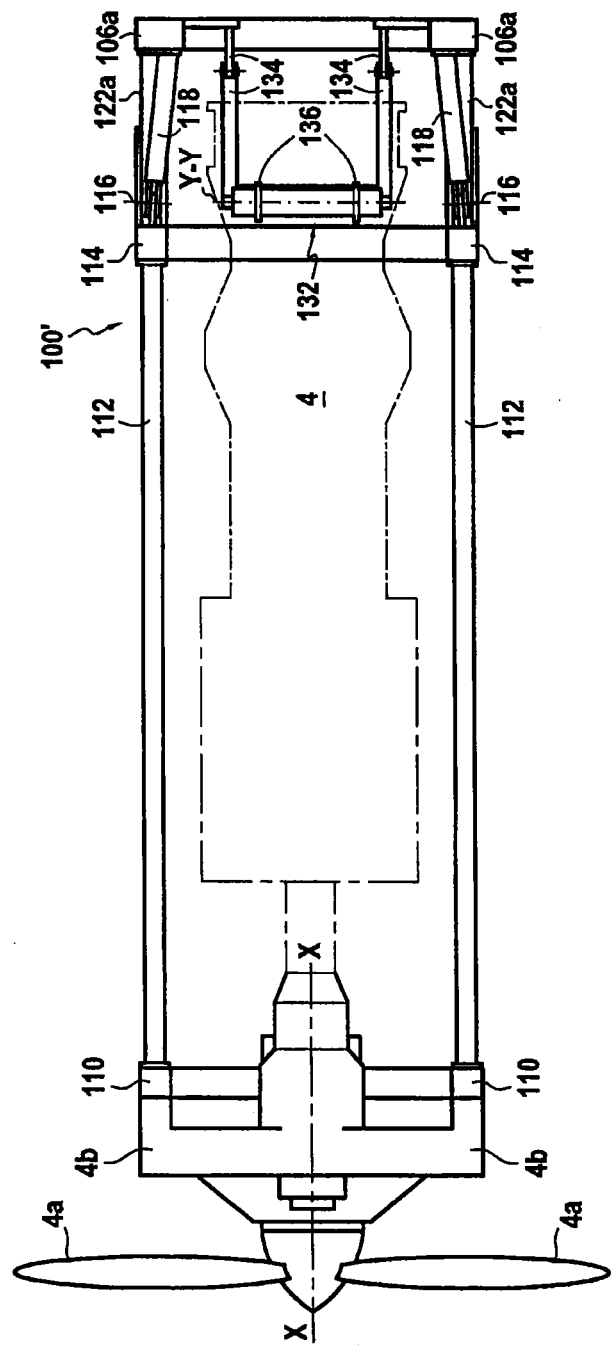

FIGS. 7 and 8 show a variant embodiment of the suspension structure 100' of the invention.

This variant embodiment differs from the above-described embodiment in particular in that the suspension structure 100' also has means for taking up the driving torque of the propeller of the turboprop.

In an embodiment shown in FIGS. 7 and 8, these driving torque take-up means comprise a torsion bar 132 that is positioned under the turboprop 4, that is firstly connected at each of its ends to the rear cradle 102 by connecting rods 134, and that is secondly fastened to the turboprop.

More precisely, the torsion bar 132 extends horizontally along an axis Y-Y perpendicular to the longitudinal axis X-X of the turboprop between the two free ends 106a of the frame 106 of the rear cradle 102. It is fastened to the rods 118 of the frame 106 by means of the connecting rods 134. In addition, the torsion bar 132 is fastened to a ring of the turboprop (not shown in the figures) by means of fastener plates 136.

As a result, the torsion bar 132 serves to take up the driving torque from the propeller of the turboprop 4, transmitting the driving torque directly to the rear cradle 102 of the suspension structure 100'. This torsion bar thus serves to off-load the systems comprising the wheels 124' and the slots 126' from the forces to which they are subjected.

This variant embodiment also differs from the above-described embodiment in that the wheels 124' that slide in the axial slot 126' formed in the main frame 114 of the front cradle extend in planes that are horizontal (and not vertical), thereby serving to improve guidance in translation.

Other means may be envisaged for taking up driving torque from the propeller of the turboprop. In a variant that is not shown in the figures, these means may for example be in the form of two hydraulic actuators arranged vertically and fastened to the rear cradle of the suspension structure.

The invention claimed is:

1. A variable geometry suspension structure for suspending a turboprop from a structural element of an aircraft, the structure comprising:
    a rear cradle for fastening to a structural element of an aircraft; and
    a front cradle supporting a front portion of the turboprop, the front cradle being connected to the rear cradle, firstly via a pivot connection configured to enable the front cradle to tilt vertically relative to the rear cradle, and secondly by a return spring configured to prevent the front cradle from tilting while thrust from the turboprop is below a predetermined threshold.

2. A structure according to claim 1, further comprising means for preventing any lateral movement of the front cradle relative to the rear cradle.

3. A structure according to claim 2, wherein the rear cradle includes at least one rod including a wheel configured to slide in an axial slot formed in the front cradle to prevent any lateral movement of the front cradle relative to the rear cradle.

4. A structure according to claim 3, wherein the slot is closed at its axial ends to limit angular amplitude of the tilting of the front cradle.

5. A structure according to claim 3, wherein the rod includes two branches forming a rearwardly-open V-shape, the wheel being positioned at an intersection between the branches of the rod.

6. A structure according to claim 3, wherein the rear cradle includes two rods positioned angularly on either side of the return spring.

7. A structure according to claim 1, wherein the return spring includes a hydraulic damper controlled by a valve to enable the position of the front cradle to be blocked on command of the pilot.

8. A structure according to claim 1, wherein the return spring possesses stiffness that is calculated so that its return force is greater than thrust from the turboprop corresponding to the aircraft being in a stage of cruising flight, and less than turboprop thrust from the turboprop corresponding to the aircraft being in a takeoff and climb stage.

9. A structure according to claim 1, wherein the rear cradle does not have means for supporting the turboprop.

10. A structure according to claim 1, further comprising means for taking up the driving torque from the propeller of the turboprop.

11. A structure according to claim 10, further comprising a torsion bar for taking up the drive torque, which torsion bar is connected at each of its ends to the rear cradle by connecting rods, and is for fastening to the underside of the turboprop.

12. An aircraft comprising at least one turboprop mounted on a structural element by a variable geometry suspension structure according to claim 1.

* * * * *